6/24/86 OR 4,596,918

United States Patent [19]

Ponghis

[11] Patent Number: 4,596,918

[45] Date of Patent: Jun. 24, 1986

[54] ELECTRIC ARC PLASMA TORCH

[75] Inventor: Nikolas G. Ponghis, Neuville-en-Condroz, Belgium

[73] Assignee: Centre de Recherches Metallurgiques Centrum voor Research in de Metallurgie, Brussels, Belgium

[21] Appl. No.: 701,863

[22] Filed: Feb. 14, 1985

[30] Foreign Application Priority Data

Feb. 17, 1984 [BE] Belgium ................................ 898951

[51] Int. Cl.[4] ............................ B23K 9/00; B23K 9/16

[52] U.S. Cl. ...................... 219/121 PM; 219/121 PR; 219/121 PQ; 219/75

[58] Field of Search ................. 219/121 PM, 121 PR, 219/121 PQ, 121 PP, 74, 75, 121 PT; 313/231.21, 231.31, 231.41

[56] References Cited

U.S. PATENT DOCUMENTS 3,387,110 6/1968 Wendler et al. .............. 219/121 PR
3,832,513 8/1974 Klasson ........................ 219/121 PQ
3,869,593 3/1975 New et al. .................... 219/121 PR

OTHER PUBLICATIONS

J. Aubreton, P. Fauchais, Les Fours a Plasma, Rev. Gen. Therm., Fr. No. 200-201, Aout-Septembre 1978, p. 681, SVV.

R. Muller, The Use of Hydrogen Plasma Processes in the Petrochemical and Iron-Producing Industries, World Hydrogen Energy Conference IV, Pasadena, U.S., 1982.

*Primary Examiner*—M. H. Paschall
*Attorney, Agent, or Firm*—Holman & Stern

[57] ABSTRACT

The plasma torch has a hot cathode (3) connectable to the negative poles of a main current course and of an arcing current source, an anode (2) connectable to the positive pole of the main current source, and an intermediate arcing electrode (6) connectable to the positive poles of both sources. An inert gas is introduced (at 8) between the cathode (3) and the arcing electrode (6). A plasma-producing gas is introduced (at 4) between the arcing electrode (6) and the anode (2). A fuel supply line (17) may open into the space between the arcing electrode (6) and the anode.

8 Claims, 3 Drawing Figures

ELECTRIC ARC PLASMA TORCH

BACKGROUND OF THE INVENTION

1. Field of the Invention

The present invention relates to an electric arc plasma torch.

2. Description of the Prior Art

Plasma torches, also called plasma burners, are devices which are well known per se and which allow for the production of a jet of gas in the form of plasma.

According to a conventional definition, a plasma is an ionized gas which comprises at least $10^{15}$ charged particles per cubic meter, and on average, very approximately as many electrons as positive ions.

The production of a plasma requires that a large amount of energy is applied to the gas. Various means are available to this end, of which the electric arc is the most frequently used.

In electric arc plasma torches, the arc is struck between two electrodes, between which a gas flows. The gas particles are ionized by the energy produced by the arc and the gas is converted into a plasma.

Most arc plasma torches are supplied with direct current, or more precisely, by rectified alternating current.

Electric arc plasma torches may be further subdivided into two categories, according to the type of cathode used, i.e. a hot cathode or a cold cathode.

A hot cathode is a cathode which is heated to a sufficiently high temperature so that it can, by thermionic effect, emit a number of electrons which in practice ensure the flow of the arc. On account of the high temperature necessary to produce an electron emission corresponding to an arc flow intensity sufficient to reach the required power and temperature, i,e, approximately 3000° C., the number of materials which can be used to manufacture a cathode of this type is very limited. Currently, only tungsten or certain alloys of tungsten are used in practice. Consequently, arc plasma torches with hot cathodes can only operate with gases which are chemically inert with regard to tungsten, such as hydrogen, nitrogen and rare gases (argon, xenon, etc . . . ). In addition to the high price of these gases, this limitation represents a serious inconvenience for this type of torch, since it is desired to use other gases. On the other hand, these cathodes have a very low rate of wear, and consequently a very long life of several hundred hours.

The second type of arc plasma torch, i.e. torches with cold cathodes, use a copper cathode, forcibly cooled to prevent it from reaching the temperature of thermionic emission. In this type of torch, aerodynamic or magnetic means, or the two simultaneously, are often used to quickly move the foot of the arc on the cathode in order to limit the wear of the latter. Torches with cold cathodes allow for the use of practically all gases. However, the lifetimes of these cathodes remains limited to a few hundred hours in the best of the cases currently known. These lifetimes are clearly lower than those of the hot cathodes on the one hand and those of the anodes on the other hand, which currently reach several thousand hours.

U.S. Pat. No. 4,002,466 discloses a plasma torch for the reduction of metal oxides, in particular for the direct reduction of iron ores. That plasma torch comprises a tungsten cathode and an anode respectively connected in the conventional way to the negative and positive poles of an electric current source. Between the cathode and the anode there is an electrically insulated nozzle intended particularly to stabilize the arc and to prevent the return of gaseous carbon from the anode towards the cathode.

SUMMARY OF THE INVENTION

The present invention relates to an arc plasma torch which combines the above mentioned advantages of hot and cold cathodes, without presenting the inconveniences, and which can facilitate and improve the establishment of the electric arc between the cathode and the anode.

The present invention provides an electric arc plasma torch which comprises:

(a) a hot cathode;

(b) an intermediate electrode, called the arcing electrode;

(c) an anode;

(d) means for introducing an inert gas between the hot cathode and the arcing electrode;

(e) means for introducing a plasma-producing gas between the arcing electrode and the anode;

(f) means for connecting the hot cathode to the negative poles of a main current source and of an arcing current source;

(g) means for connecting the arcing electrode to the positive poles of a main current source and of an arcing current source;

(h) means for connecting the anode to the positive pole of the said main current source.

According to a particular embodiment of the invention, the plasma torch comprises two chambers separated by the arcing electrode and connected to each other by means of an opening formed in the said arcing electrode, one of the two chambers, called the cathode chamber, being provided with the hot cathode (a) and the means (d) for introducing an inert gas, and the other chamber, called the anode chamber, being partially formed by the anode (c) and being provided with the means (e) for introducing any type of plasma-producing gas.

Also according to the invention, the means for introducing the gas into at least one of the said chambers is disposed in such a manner as to confer a movement, preferably helicoidal, to the gas in the said chamber.

Furthermore, it is known that numerous industrial processes comprise injection of carbonaceous material which acts as a fuel or as a reducing agent in widely varying processes. This is particularly the case in the field of blast furnaces, where attempts are currently being made to replace liquid or gaseous hydrocarbon injections, which are too expensive, by injections of solid materials, which are less expensive, such as carbon or coal. However, these solid materials have the inconvenience of very low reaction kinetics, entailing very long reaction time, which are generally incompatible with the speed of the processes in which they are used. In order to improve these reaction kinetics, it has been known for a long time to use materials having an increasingly fine granulometry, obtained notably by grinding. The present applicant has recently taken a further step in this direction by proposing to inject into a blast furnace carbon in the form of a vapor, obtained by the sublimation of fine carbon in a plasma flame.

A particularly interesting embodiment of the present invention relates to a plasma torch which actually allows for the production of gaseous carbon from a solid fuel.

In accordance with the above description, this plasma torch has an arcing electrode disposed between a hot cathode and an anode. It is further characterized in that it has at least one fuel supply line, which opens into the space between the arcing electrode and the anode, and preferably immediately upstream of the inlet section of the anode chamber.

Most of this line is preferably parallel to the longitudinal axis of the plasma torch. However, according to a particular embodiment of the invention, its outlet is positioned so that its axis intersects the longitudinal axis of the anode downstream of the upstream end of the anode. The speed at which the fuel enters the anode chamber is adjusted so that it is not centrifuged by the plasma-producing gas and so that it does not obstruct the supply passages of the latter. This speed is adjusted according to the flow of the fuel and the plasma-producing gas. However, at no time may the speed of the fuel be slower than 5 m/s and that of the plasma-producing gas slower than 50 m/s.

In cases where the plasma torch has a plurality of fuel supply lines, these are advantageously uniformly distributed about the longitudinal axis of the torch so as to ensure an even supply of the fuel.

BRIEF DESCRIPTION OF DRAWINGS

For comparative and illustrative purposes, a plasma torch of the prior art and two preferred embodiments of plasma torches according to the invention will now be described, with reference to the accompanying drawings, wherein.

These representations are of course schematic and are not drawn to an exact scale.

DETAILED DESCRIPTION OF

Figure 1:
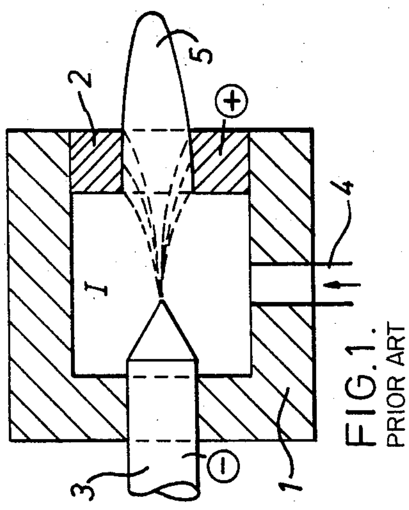
FIG.1. PRIOR ART
FIG. 1 is a schematic axial cross-sectional view of a plasma torch of the prior art.

A conventional plasma torch, such as is illustrated in FIG. 1, comprises a chamber I defined on the one hand by a casing 1 of insulating material and on the other hand by a wall 2 forming the anode, usually of copper. The cathode 3, for example of tungsten, is arranged in a wall of the casing 1, preferably opposite the anode 2. These two electrodes 2 and 3 are connected respectively to the positive and negative poles of a direct or rectified current source. The casing 1 is also provided with a passage 4 for the introduction of the plasma-producing gas and the anode has an opening for the ejection of the plasma jet 5.

In a torch of this type, the cathode may be of tungsten, i.e. "hot", in which case it requires the use of a gas which is chemically inert with respect to this element. It may instead be "cold", i.e. of cooled copper, with the inconveniences mentioned above relating to the poor resistance to wear by erosion.

Figure 2:
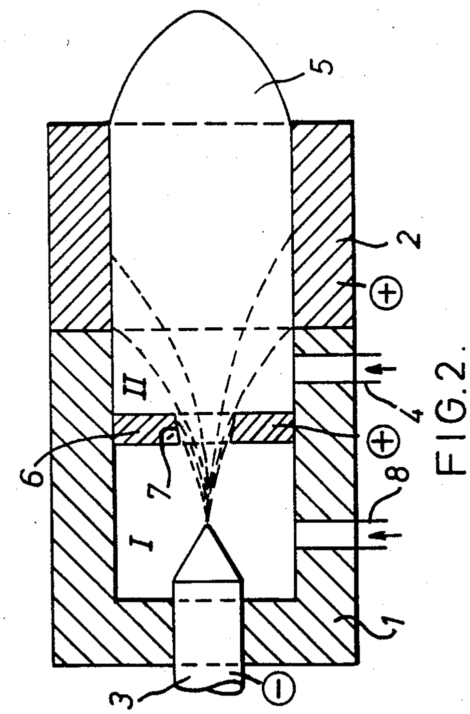
FIG. 2 is a view similar to FIG. 1 of a plasma torch according to the present invention.

FIG. 2 shows a plasma torch according to the invention, which does not have these inconveniences. This torch comprises an open casing 1 of insulating material, extended by a copper anode 2.

The assembly is divided into two chambers I and II separated by an arcing electrode 6 which is disposed in the insulating casing, a certain distance from the end of the casing. The chamber I, the cathode chamber, is provided with a hot cathode 3 and has an opening 8 for the introduction of a gas which is chemically inert with regard to tungsten. The chamber II, the anode chamber, is provided with at least one passage 4 for the introduction of the plasma-producing gas, which may be any type of gas. This passage 4 is preferably provided in the part of the chamber II which comprises insulating material. It is positioned so as to impart a helicoidal movement to the gas in the anode chamber. The arcing electrode has at least one channel 7, preferably centrally, which connects the two chambers I and II. This channel advantageously has a divergent section. The distance between the cathode 3 and the arcing electrode 6 is adjustable in the range from zero to 5 mm, the zero distance corresponding to contact of the cathode with the arcing electrode. The adjustment of this distance is preferably effected by the displacement of the cathode 3 along its longitudinal axis, for example by means of a screw device. The anode 2 is connected to the positive pole of a first current source, the main current source. The arcing electrode 6 is connected simultaneously to the positive pole of the main current source and to the positive pole of a second current source, the arcing current source, of lower voltage. The power of this second source is at least 5 kW and is preferably about 10 kW. Its off-load voltage is dependent upon the type of cathode gas. For example, it is at least 50 V for argon, 100 V for nitrogen, and 200 V for hydrogen.

The cathode 3 is at the same time connected to the negative poles of the main and the arcing current sources. A third current source of very low power (at least 50 W) with a high voltage and high frequency, is connected between the cathode and the arcing electrode. The voltage of this third source is higher than the breakdown voltage between the cathode and the arcing electrode (4 kV) and its frequency is produced by an oscillating discharge of an oscillating circuit or by a Tesla transformer.

The palsma torch shown in FIG. 2 operates in the following manner. The cathode and the plasma-producing gas supplies are opened. At the same time the second and third current sources are connected. The connection of the third current source breaks the resistance of the gas circulating between the cathode 3 and the arcing electrode 6, allowing for the creation of a sufficiently high arcing current (100–400 A) between the cathode and the arcing electrode. This arcing current produces a plasma jet of low power which is struck in the anode chamber across the channel 7 of the arcing electrode 6. When this plasma jet is established, the third current source is disconnected. The main current source is connected. As a result of the plasma jet which has been formed, an electric current issuing from this main source flows between the cathode 3 and the anode 2. The arcing current source is then disconnected, so that only the main current source remains connected.

Figure 3:
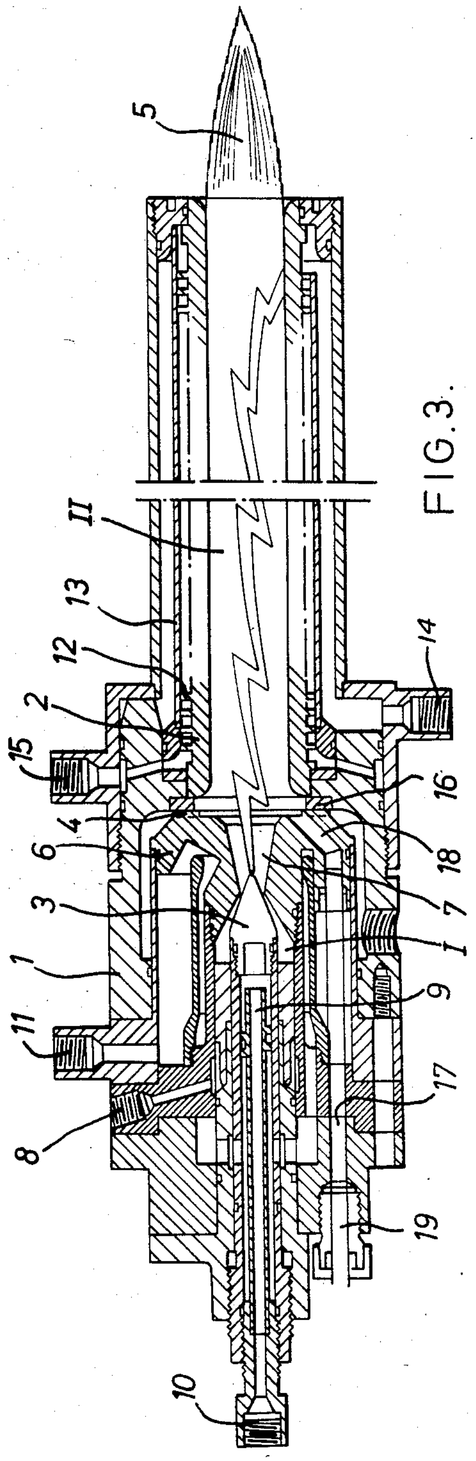
FIG. 3 is a detailed axial cross-sectional view of a plasma torch comprising a fuel supply line, in accordance with a particular embodiment of the invention.

In principle, the plasma torch illustrated in FIG. 3 conforms to the diagram of FIG. 2 and corresponding components are designated by the same reference numbers. The description relating to FIG. 2 also applies to the torch in FIG. 3 and does not therefore require repetition. However, the torch in FIG. 3 has several additional characteristics which will be clarified for the sake of interest.

The hot cathode 3 has a pointed head so as to facilitate the arcing of the plasma torch. The cathode 3 is also provided with a cooling duct 9 supplied with water at 10.

The copper arcing electrode 6 is also water-cooled via a circuit which may be series connected with that of the cathode. The cooling water is removed via the outlet 11. The downstream end of the arcing electrode 6 has a ring in which a plurality of passages 4 is provided in the form of ducts or channels for the introduction of the plasma-producing gas. These passages 4 are uniformly distributed in the ring, their outlet openings, in the internal surface of the ring, being disposed very close to one another, and preferably connected so that the plasma-producing gas forms a continuous jet over the entire internal periphery of the ring. In addition, these passages 4 are positioned so that a helicoidal movement is imparted to the emerging plasma-producing gas in the anode chamber II. Finally, the speed of the plama-producing gas must be at least 50 m/s at the anode chamber inlet.

The anode 2 is provided with a peripheral or spiral cooling circuit, formed by helicoidal fins 12 covered by a tube 13. The cooling water enters at 14 and is removed at 15.

Between the arcing electrode 6 and the anode 2 is disposed a collar 16 of electrically insulating refractory material, which is centered on the longitudinal axis of the torch. The material which constitutes the collar 16 is of a conventional type. It is for example asbestos based, silica based, or aluminia based. The collar 16 is applied to the surface of the downstream end of the arcing electrode 6, and where necessary, obturates the channels 4 cut in this surface. With its other surface, the collar 16 rests on a shoulder provided in the casing 1 and forms the bearing surface of the inlet section of the anode 2. The internal diameter of the collar 16 is at least equal to that of the anode 2, and is preferably substantially equal to the internal diameter of the anode +10 mm.

Through the body of the plasma torch a fuel supply line 17 is provided, for example fine carbon or coal transported by a gas under pressure. The outlet section 18 of this line passes through the arcing electrode 6 and opens into the inside of the collar 16. The axis of the outlet of this section 18 intersects the longitudinal axis of the anode 2 at an angle of approximately 45°.

As regards the production of the plasma, this torch functions in the same manner as that of FIG. 2. A cathode gas which is inert with regard to tungsten, for example nitrogen, hydrogen, rare gases, or a mixture of these gases, is introduced via 8 into the cathode chamber I. The plasma-producing gas is introduced at the inlet of the anode chamber II via the passages 4 provided in the cover of the arcing electrode 6.

The fine carbon or coal is introduced at 19 into the line 17, 18, and is injected into the anode chamber II, where it is converted into a vapor state by the effect of the high temperature, which exceeds 3500° C., in the plasma jet.

In order to ensure rapid and complete sublimation of coal, it is preferable to use a fine coal, of the type used for boilers, i.e. having approximately 70% of the grains smaller than 74 $\mu$m.

The gas transporting the carbon or coal is preferably air, possibly enriched with nitrogen for well known reasons of security against explosion.

It is also expedient to prevent the fine carbon or coal from being deposited and accumulating at the outlet of the line 18, which would become blocked. The applicant has found that this risk of obstruction does not exist if the injection speed of the carbon is at least 5 m/s.

Under these conditions, the injected carbon or coal does not accumulate and block the torch. It is almost completely sublimated and is thus in the form of gaseous carbon or coal, which, when injected into a blast furnace for example, reacts very rapidly with the oxidized ores and with the oxygen of the hot blast.

During normal operation, i.e. after the arcing period, the power of plasma torches according to the invention can be adjusted in three different ways.

A first means consists in using different types of cathode gases. Thus, while everything else remains the same, the replacement of argon by nitrogen can increase the power by approximately 20%.

Furthermore, it is also possible to affect the power by varying the current of the arc by any suitable electrical means. For a constant voltage, the power is in fact approximately proportional to the intensity of the current of the arc.

Finally, it is possible to regulate the power of the torch by adjusting the flow at which the gas is introduced into the anode chamber. When the current of the arc remains constant, the power of the torch is approximately proportional to the flow of the anode gas.

In cases where the torch has carbon or coal injection, it is necessary to take into account the gasification of the carbon and the corresponding additional supply of gas, which causes a change in the power. Furthermore, the supply of gaseous carbon leads to a change in the composition of the gas, which influences the operating voltage of the torch. Consequently, the power does not necessarily vary in the same manner as in the case of an increase in the flow of gas where the composition is constant.

The preceding description shows that the plasma torches according to the invention combine the advantages of hot and cold cathodes, i.e. a long lifetime and the possibility of using any type of plasma-forming gas, while avoiding their respective inconveniences.

Of course, the invention is not limited to the embodiments which have just been described in more detail, but also extends to cover any variation which falls within the scope of the following claims.

I claim:

1. In an electric plasma torch supplied with direct or rectified electrical current, including a cathode, an anode, and an intermediate arcing electrode, a first cathode chamber formed between said cathode and said intermediate arcing elecrtrode, a second anode chamber located downstream of said first chamber and formed between said intermediate arcing electrode and said anode, a main current source connected between said cathode and said anode, an arcing current source connected between said cathode and said intermediate arcing electrode, the cathode being connected to the negative pole of both said current sources, and at least one passage formed in said intermediate arcing electrode through which the first and second chambers communicate, the improvement comprising:

means to adjust the penetration of said cathode into said first cathode chamber for varying the distance between said cathode and said intermediate arcing electrode;

said cathode comprises a hot cathode;

means for introducing a first inert gas into said first cathode chamber;

means for introducing a second plasma forming gas into said second anode chamber;

said intermediate arcing electrode and anode are relatively axially spaced; and at least one fuel supply conduit having an outlet opening into the space between said intermediate arcing electrode and said anode.

2. The plasma torch as claimed in claim 1 wherein said fuel supply line outlet extends through the downstream end face of said intermediate arcing electrode.

3. The plasma torch as claimed in claim 1 wherein:

said anode has a longitudinal axis; and said fuel supply conduit outlet has an axis which intersects said longitudinal anode axis downstream of the upstream end of said anode.

4. The plasma torch as claimed in claim 1 and further comprising:

an annular collar of electrically insulating refractory material having an internal diameter at least equal to that of said second anode chamber.

5. The plasma torch as claimed in claim 4 wherein said internal diameter of said collar is approximately 10 mm greater than that of said second anode chamber.

6. The plasma torch as claimed in claim 2 wherein:

said anode has a longitudinal axis; and said fuel supply conduit outlet has an axis which intersects said longitudinal anode axis downstream of the upstream end of said anode.

7. The plasma torch as claimed in claim 6 and further comprising:

an annular collar of electrically insulating refractory material having an internal diameter at least equal to that of said second anode chamber.

8. The plasma torch as claimed in claim 7 wherein said internal diameter of said collar is approximately 10 mm greater than that of said second anode chamber.

* * * * *